(12) United States Patent
Airoldi et al.

(10) Patent No.: US 7,566,031 B2
(45) Date of Patent: Jul. 28, 2009

(54) TRIGGERING SYSTEM FOR THE PLASTIC COLLAPSE OF A METAL STRUCTURAL ELEMENT

(75) Inventors: Alessandro Airoldi, Milan (IT); Janszen Gerardus, San Donato Milanese (IT); Carlo Bergamelli, Nembro (IT); Massimiliano Sanvito, Carate Brianza (IT)

(73) Assignee: Politecnico Di Milano, Milan (IT)

( * ) Notice: Subject to any disclaimer, the term of this patent is extended or adjusted under 35 U.S.C. 154(b) by 372 days.

(21) Appl. No.: 10/559,134

(22) PCT Filed: May 28, 2004

(86) PCT No.: PCT/EP2004/005805

§ 371 (c)(1), (2), (4) Date: Apr. 3, 2006

(87) PCT Pub. No.: WO2004/106769

PCT Pub. Date: Dec. 9, 2004

(65) Prior Publication Data

US 2006/0208134 A1  Sep. 21, 2006

(30) Foreign Application Priority Data

Jun. 3, 2003 (IT) ......................... MI2003A1106

(51) Int. Cl.
*B64C 25/00* (2006.01)
*B64C 25/10* (2006.01)

(52) U.S. Cl. ............................. 244/100 R; 244/102 SS; 293/133; 188/377; 248/548

(58) Field of Classification Search ............. 244/100 R, 244/102 R, 102 A, 102 SS, 102 SL, 107; 296/187.03, 187.09; 293/133; 188/371, 188/376, 377; 248/548; 464/162
See application file for complete search history.

(56) References Cited

U.S. PATENT DOCUMENTS

| 3,997,133 | A | * | 12/1976 | Fagan | 244/104 R |
| 5,431,445 | A | * | 7/1995 | Wheatley | 280/784 |
| 5,547,148 | A | * | 8/1996 | Del Monte et al. | 244/104 FP |
| 6,308,809 | B1 | | 10/2001 | Reid et al. | |
| 7,025,686 | B1 | * | 4/2006 | Aiken | 464/162 |
| 2003/0042763 | A1 | * | 3/2003 | Yamada et al. | 296/205 |

FOREIGN PATENT DOCUMENTS

| DE | 42 06 717 | 9/1992 |
| DE | 42 06 782 | 9/1992 |
| GB | 1 371 331 | 10/1974 |
| GB | 1 378 130 | 12/1974 |

* cited by examiner

*Primary Examiner*—Michael R Mansen
*Assistant Examiner*—Stephen Brookman
(74) *Attorney, Agent, or Firm*—Wenderoth, Lind & Ponack, L.L.P.

(57) ABSTRACT

A system for absorbing energy to attenuate a force caused by an impact includes: an elongated tubular element; a fixed ring having a plurality of wedge-shaped flanges associated with the elongated tubular element; and a mobile element associated with the fixed ring. In response to movement toward the wedge-shaped flanges, the mobile element interacts with the wedge-shaped flanges, which in turn interact with the elongated tubular element so as to trigger collapse of the elongated tubular element.

14 Claims, 6 Drawing Sheets

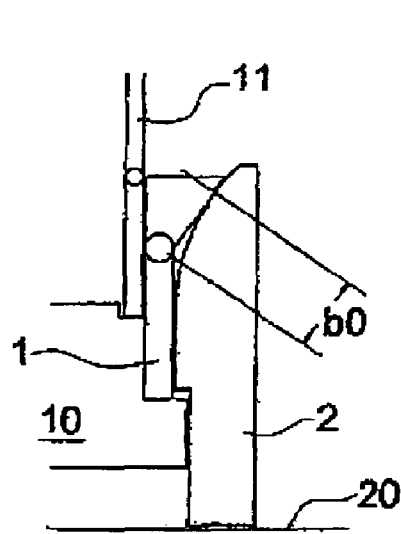
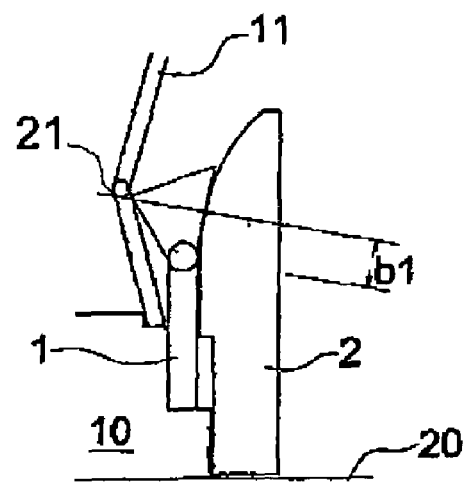
Fig.5  Fig.6
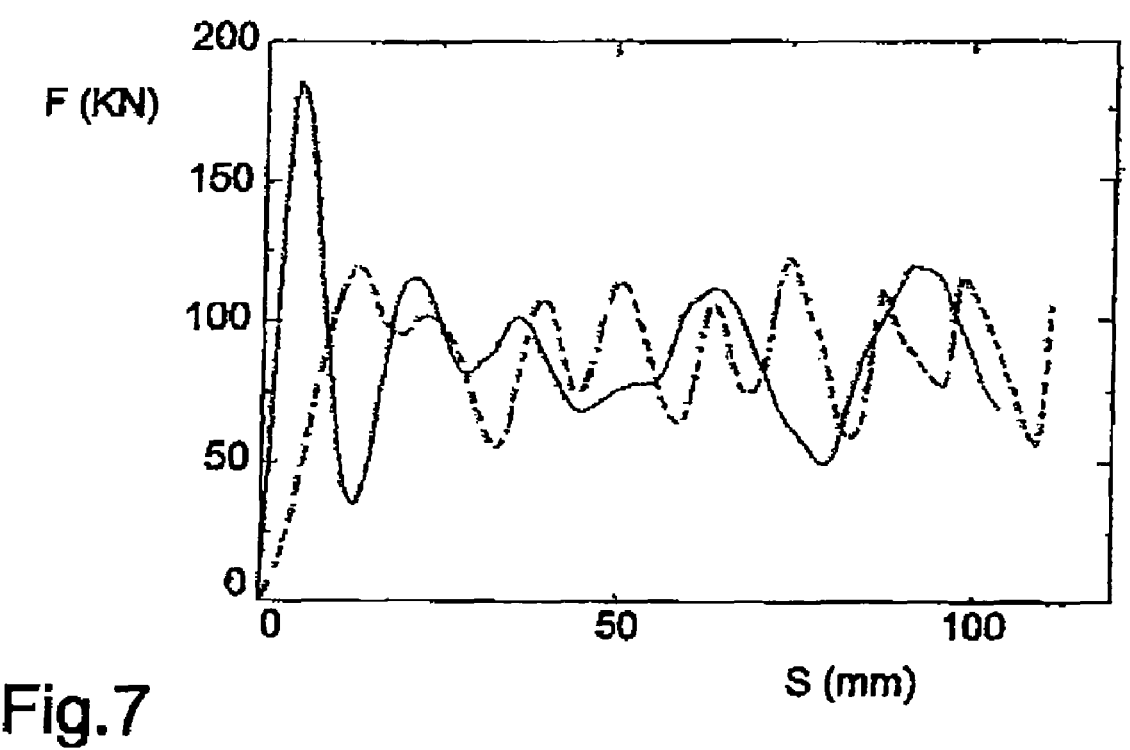
Fig.7

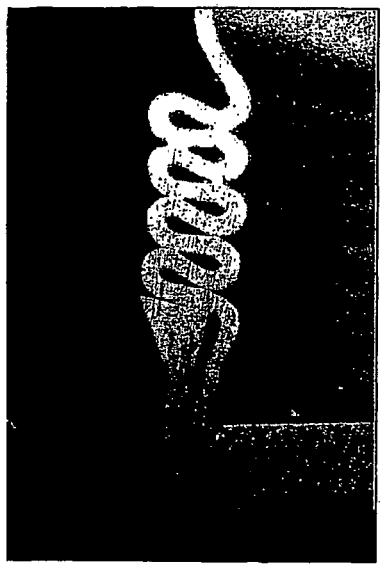
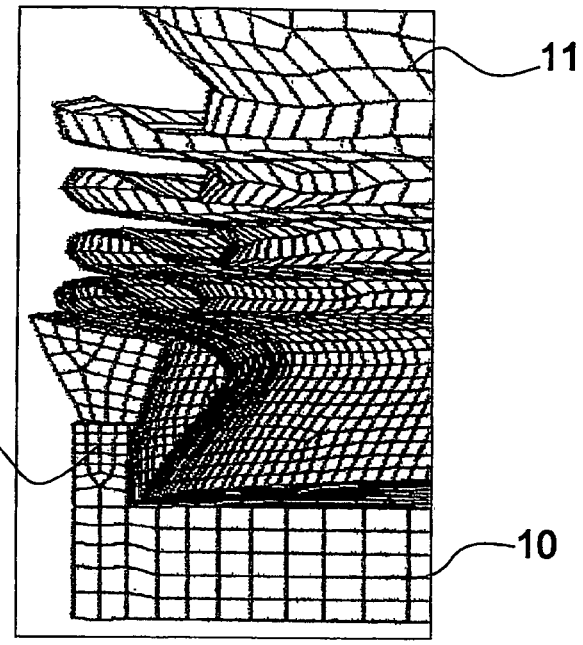
Fig.8  Fig.9
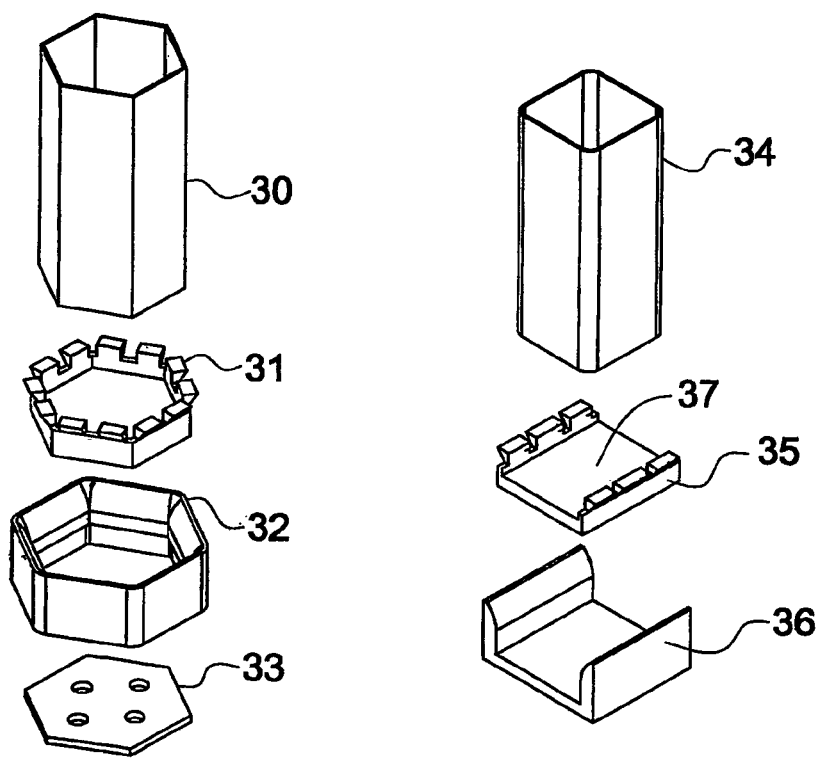
Fig.10  Fig.11

TRIGGERING SYSTEM FOR THE PLASTIC COLLAPSE OF A METAL STRUCTURAL ELEMENT

BACKGROUND OF THE INVENTION

1. Field of the Invention

The present invention refers to an apparatus for absorbing energy to attenuate a force caused by an impact. In particular, it refers to a triggering system for the plastic collapse of a metal structural element, particularly suitable for attenuating forces generated by high-velocity impacts, such as in the case of aircraft accidents.

2. Description of the Related Art

Various devices have been produced in the past in order to minimize damage to people and vehicles caused by possible high-velocity impacts of aircraft. Such devices are based on the failure of metal elements, and some include a particular apparatus for triggering the collapse of the element provided for absorbing energy.

U.S. Pat. No. 3,997,133 describes landing gear that includes an energy absorbing element coaxial to the cylinder of the shock strut. The cylinder is secured to a connection structure of the fuselage by a frangible fitting constituted by a system of weakened bolts. When the failure force of the bolts is reached, a system of flanges coupled to the cylinder engages the sacrificial energy absorbing element working it plastically so as to cut it into longitudinal strips.

U.S. Pat. No. 5,547,148 describes a landing gear that includes an expendable element coaxial to the cylinder of the shock strut. The cylinder is fixed to a connection structure of the fuselage by a load control system made of a trunnion fitted with flanges, designed to fail at a certain level of axial force transmitted by the system. The expendable element is represented by a tube which, with the failure of the flanges, is engaged by a conical surface that deforms it, gradually buckling its walls outwards and fracturing them.

U.S. Pat. No. 6,308,809 describes a system for absorbing energy based on the plastic deformation of a thin-walled tube. A conical mandrel engages the tube, applying a pressure on the walls which is outwardly directed. The tube becomes plastic and successively gradually collapses fracturing along longitudinal lines.

SUMMARY OF THE INVENTION

In view of the state of the art, as described above, the aim of the present invention is to provide a system for activating and controlling the plastic collapse of a metal structural element in case of impact, which is of simple execution.

In accordance with the present invention, this aim is achieved by means of a system for triggering the plastic collapse of a metal structural element comprising: an elongated tubular element; a fixed ring having a plurality of wedge-shaped flanges associated with the elongated tubular element; and a mobile element which is associated with the fixed ring. The mobile element slides in the direction of the elongated tubular element and the wedge-shaped flanges, and interacts with the wedge-shaped flanges, which in turn interact with the elongated tubular element so as to trigger collapse of the elongated tubular element.

The above-mentioned aim is also achieved by means of an aircraft landing gear comprising a shock strut in series with the above-described system for triggering the plastic collapse of a metal structural element. The present invention enables the realization of an aircraft landing gear that minimizes the forces transmitted to the fuselage in high velocity impacts.

In the present invention, after a first buckle is created in the in the thin wall of the metal structural element other buckles will consequently be formed, all symmetrically and equidistant along the walls, with the result of a regular, symmetric collapse. The load peaks can be eliminated in the initial phase of the collapse, minimizing the value of the maximum loads applied to the structure for a given level of average collapsing force. It is also possible to avoid the introduction in the structure of the landing gear of frangible constraints designed to fail at a preset force level, thereby simplifying the structure of the system, its operating mechanism and guaranteeing high reliability and durability of the system. The proposed solution, in addition, enables the absorbing stage based on the failure of the sacrificial element to be activated only when the absorption capacities of the oleo dynamic shock absorber have been completely exploited.

Advantageously, the expendable structure (absorbing tube) can normally be a structural element under load.

BRIEF DESCRIPTION OF THE DRAWINGS

The characteristics and advantages of the present invention will appear evident from the following detailed description of one of its embodiments by reference to the accompanying drawings, in which:

FIG. 5 shows schematically the triggering mechanism illustrated in FIG. 4 before the system triggers;

FIG. 6 shows schematically the triggering mechanism illustrated in FIG. 4 at the beginning of the triggering of the system;

FIG. 7 is a graph that shows the curve of the force F (KN) versus the element shortening S (mm) of a reference tube without a triggering mechanism, and of a system in accordance with the present invention;

FIG. 9 is a longitudinal sectional view of the deformed shape of a system in accordance with the present invention obtained with a numerical finite element model;

FIG. 10 is a perspective view of a triggering mechanism including a tubular absorbing element with a hexagonal cross-section in the assembly phase in accordance with the present invention;

FIG. 11 is a perspective view a triggering mechanism including a tubular absorbing element with a square cross-section in the assembly phase in accordance with the present invention;

DETAILED DESCRIPTION OF THE INVENTION

Figure 2:
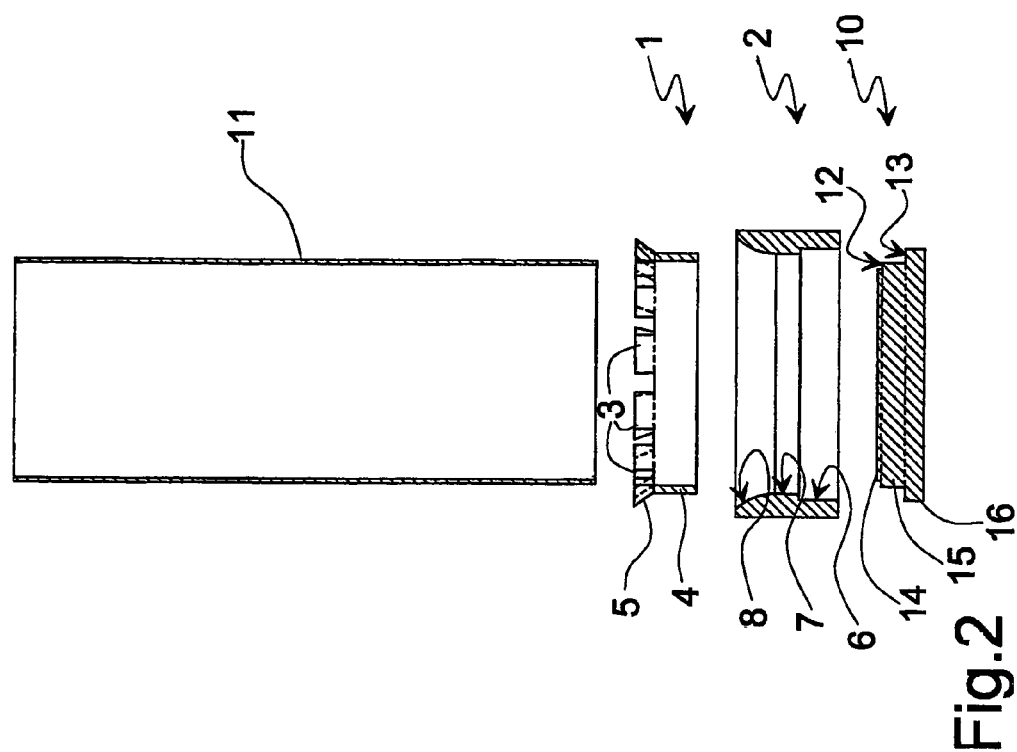
FIG. 2 is a cross-sectional view of a triggering mechanism including a tubular absorbing element in the assembly phase in accordance with the present invention.

The plastic collapse of metal casings with a thin-walled section, subject to axial loads, is characterized by the progressive development of buckles according to a periodic pattern along the walls of the element, such that the element gradually shortens. The curve of the collapse load vs. the shortening of the element is characterized, consequently, by a periodic course, which, for even section casings, oscillates about a clearly identifiable value of average load. This collapse mode, which can be obtained for a wide interval of values of the geometric ratios typical of the element, is of particular interest in producing elements with high energy absorption performances, collapsing at approximately constant load levels when axially loaded.

In order to trigger the stationary phase of the process, it is however necessary to apply a load greater than the instability load of the metal casing, depending, in general, on the geometric characteristics of the element, on the mechanical properties of the material, on the velocity, on the method of applying the load, on the constraint conditions and, to a non-negligible extent on the shape imperfections. The stationary phase is therefore typically preceded by a load peak of significantly higher value than the average collapse load. As an example, for cylindrical tubes made of a light aluminium alloy with simply supported edges, and a ratio between the diameter and the thickness of the walls of between 10 and 100, the load peak can vary between 1.3 and 3.5 times the average collapse load. This effect is undesired in the performance of the absorber, whose purpose is to minimize the forces transmitted to the structure, absorbing as much energy as possible at a well controlled and constant load level.

For the reduction of the maximum load values during the initial phase of the failure process, the use of mechanical machining, such as bevelling or holes at an end of the metal casing is common. These systems thus reduce the instability load of the metal casing and therefore are not suitable for optimizing the performances of elements that have structural functions that are different from the absorption of energy in impact conditions.

In addition, the failure can come about in an uncontrolled manner when the casing buckles in an irregular manner.

The mechanism of the present invention permits, on the contrary, the optimization of the energy absorption performances of a thin-walled element which is not purely expendable, but has structural functions that require adequate safety margins in normal operating conditions. The instability load of the metal casing is knocked down only when an impact occurs that causes abutment of a mechanism capable of inducing a deformation on the side walls of the element, thus initiating the collapse. The system, designed for tubular elements with circular cross-sections, can be adapted to thin-walled elements with different cross-sections; and the collapse method is characterized by the gradual formation of buckles.

The triggering mechanism of the collapse is illustrated in its application to a tube having a circular cross-section. For energy absorbers produced with elements of this type, the typical applications provide for ratios between diameter D and thickness t, D/t, between 10 and 100, even though, for cylinders made of light aluminum alloy, the failure mechanism for progressive formation of buckles has been observed for values of the ratio D/t up to 400. The length L of the element should be less than that corresponding to the Eulerian instability load of the element. The average load value during the stationary phase of the collapse can be approximately identified by means of expressions that can be found in the scientific literature. These formulas, derived from simplified mechanical models of the failure process or obtained with empiric methods, permit expression of the ratio between the average load, $P_m$, and the moment of the plastic collapse of the thin wall per unit of length, $M_0$, as functions of the ratio between the average diameter and the thickness of the element (D/t). The moment per unit of length, $M_0$, can be determined when the value of the yield stress, $\sigma_0$, of the material is known, assuming a rigid-perfectly plastic behavior.

An example of an equation for the calculation of the value of the average load during the stationary phase, given herein below, is described in the article by Abramowicz, W., Jones, N., "Dynamic Axial Crushing of Circular Tubes", International Journal of Impact Engineering, Vol. 2, 1984, p. 263-281.

$$\left(\frac{P_m}{M_0}\right)_1 = \frac{8\pi^{1.5}\left(0.5\frac{D}{t}\right)^{0.5}}{3^{0.25}\left(0.86 - 0.37\left(0.5\frac{D}{t}\right)^{-0.5}\right)}$$

Another example of an equation for the calculation of the value of the average load during the stationary phase, given herein below, is described in the article by Guillow, S. R., Lu, G., Grzebieta, R. H., "Quasi-static axial compression of thin-walled circular aluminum tubes", International Journal of Mechanical Sciences, Vol. 43, 2001, p. 2103-2123

$$\left(\frac{P_m}{M_0}\right)_2 = 72.3\left(\frac{D}{t}\right)^{0.32}$$

Yet another example of an equation for the calculation of the value of the average load during the stationary phase, given herein below, is described in the article by Abramowicz, W., Jones, N., "Dynamic Progressive Buckling of Circular and Square Tubes", International Journal of Impact Engineering, Vol. 4, 1986, p. 243-269

$$\left(\frac{P_m}{M_0}\right)_3 = 86.14\left(\frac{D}{t}\right)^{0.33}$$

Where $$M_0 = \frac{1}{4}\sigma_0 t^2$$

The failure process characterized by the progressive formation of buckles can be utilized to produce absorbers with sections whose typical dimension can vary from tens to hundreds of millimeters, with average failure loads variable from thousands to hundreds of thousands of Newtons. The triggering mechanism should be adapted, by choice of the materials and dimensions, to the absorber on which installation is intended.

The material should possess adequate toughness, so as to avoid the formation of fractures during the development of the buckles. The maximum deformation reached in the external fibers of the walls of the cylinder, during the formation of the buckles, increases with the wall thickness. In order to avoid fractures, the ultimate elongation of the material therefore must be greater for elements with low ratio between diameter and thickness. Excellent results are obtained with mild steels, with low percentage of carbon, high ultimate plastic stain, and with heat treatable aluminium (series 2000, 6000, 7000) in the annealed state (O). To maximize the ratio between the energy that can be absorbed and the weight of the element, the aluminium alloys of the series 6000 allow achievement of failure modes in absence of fractures for values of the ratio D/t between 10 and 100, with good yield stress values and, consequently, of average load (Al6060-T5, Al6061-T6). Aluminium alloys of the series 2000, can be used with suitable thermal treatments (Al2024-T3, Al2024-T4, Al2024-T42), for not excessively low values of D/t.

Figure 1:
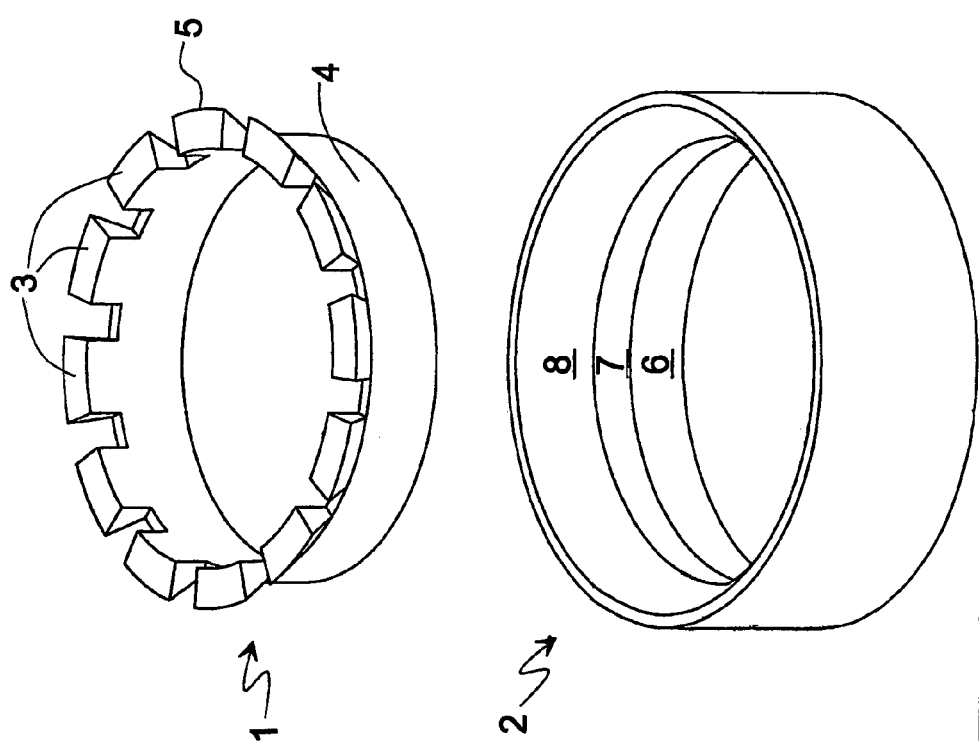
FIG. 1 is a prospective view of a triggering mechanism in accordance with the present invention.

FIG. 1 is a prospective view of a triggering mechanism in accordance with the present invention constituted by two coaxial rings. The triggering mechanism includes a first fixed ring 1 fitted with flanges 3 having a wedge shape, and a mobile ring 2 with a suitably profiled internal surface.

The fixed ring 1 consists of a first cylindrical tabular lower portion 4, and a second tubular upper portion 5 comprising the flanges 3 separated from each other by empty spaces. The inner diameter of the two portions is identical. The outer diameter of the second tubular portion 5, defined by the external surface of the flanges, starts equal to that of the first tubular portion 4 and progressively increases, so that the flanges assume a wedge shape, in section, in particular of a right angle triangle.

The mobile ring 2 is composed of by three internal portions. The outer diameter of the ring is identical at each of the three portions. The inner diameter of a first internal portion 6 is slightly larger than that of a second internal portion 7, and both have a circular shape. A third internal portion 8 has an inner diameter that starts equal to the inner diameter of the second internal portion 7 and is gradually tapered with a tapering profile preferably corresponding to a circumferential arc.

FIG. 2 shows, in section and in the assembly phase, the fixed ring 1 and the mobile ring 2 with an absorber tube 11 and an element 10 for supporting and securing the triggering mechanism (made up of the elements 1 and 2) to the tube 11.

The element 10 for supporting and securing the triggering mechanism is constituted by three disks 14, 15 and 16 having progressively increasing diameters, which are joined together and layered over each other. The first abutment 12 that is created between the first disk 14 (that between the three disks having lower diameter and of lower value than the inner diameter of the tube 11) and the second disk 15 is suitable and set up for supporting the tube 11. The second abutment 13 that is created between the second disk 15 (having higher diameter than the outside diameter of the tube 11) and the third disk 16 supports the fixed ring 1 and the protuberance of the second internal portion 7 of the mobile ring 2.

Figure 3:
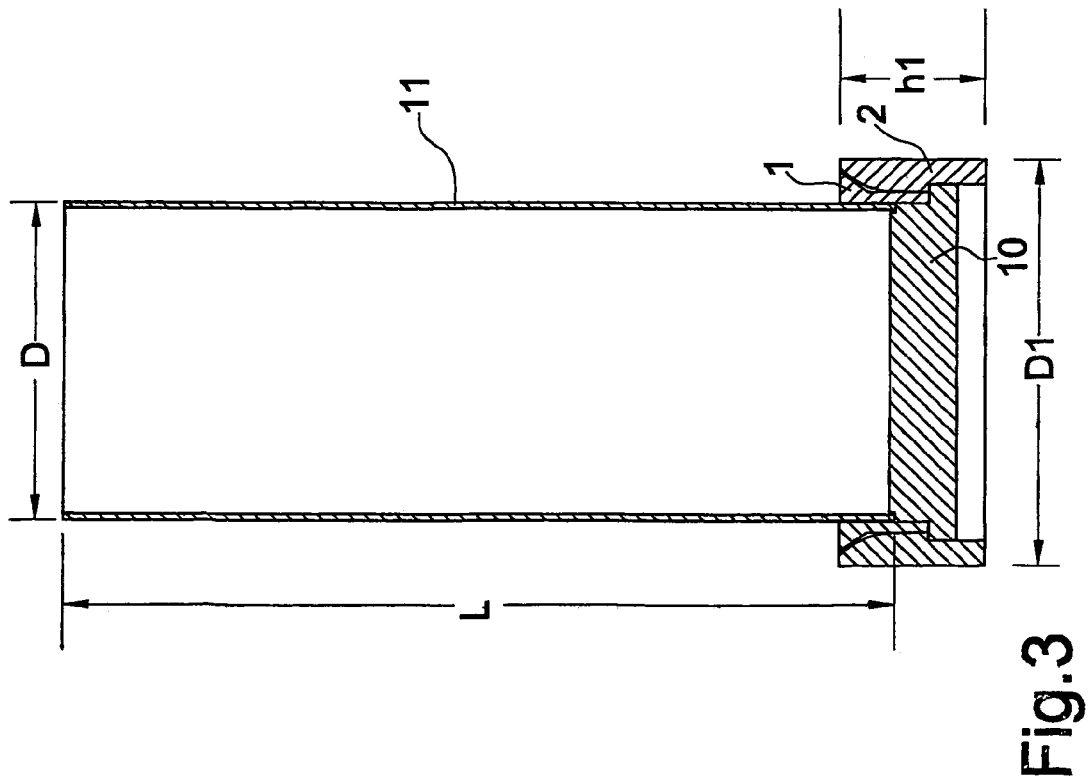
FIG. 3 is a cross-sectional view of a triggering mechanism including a tubular absorbing element assembled in accordance with the present invention.

FIG. 3 shows the elements of FIG. 2 assembled and ready for their function. The fixed ring 1 is connected to the element 10 for example by means of a threaded coupling.

The mobile ring 2 is mounted between an abutment on the support element 10 and the flanges 3 of the fixed ring 1 and, thereby, prevented from slipping off. The tube 11 can be simply placed on the rings 1 and 2, or connected to them by means of an interference mounting, or secured with a threaded coupling to the internal surface of the fixed ring 1 or, welded to the support element 10.

In FIG. 3, reference D indicates the average diameter of the tube 11 and L its length; D1 indicates the outside diameter of the mobile ring 2 and h1 its height.

Figure 4:
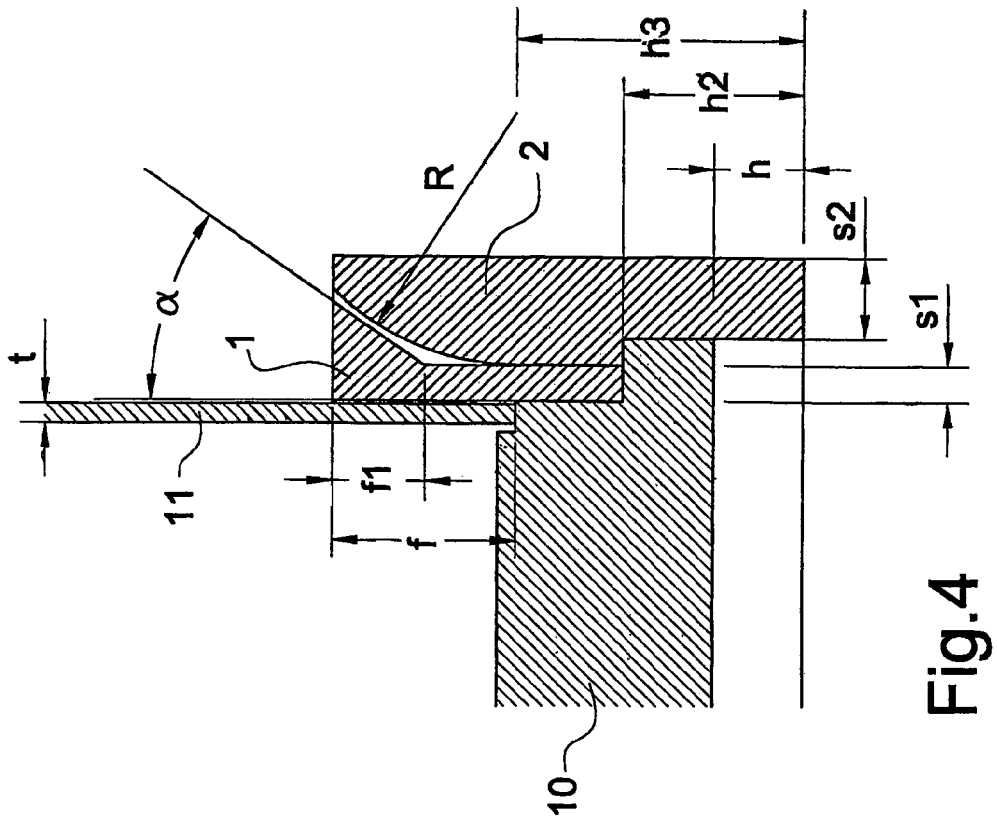
FIG. 4 is a detailed cross-sectional view of the triggering mechanism including a tubular absorbing element assembled in accordance with the present invention.

FIG. 4 is a detailed cross-section of the assembled system illustrated in FIG. 2, where t indicates the thickness of the tube 11, f the portion of tube 11 that is inserted into the fixed ring 1, f1 the height of the flange 3, α the angle that the external surface of the flanges 3 form with the vertical axis, s1 the thickness of the first tubular portion 4 of the fixed ring 1, s2 the thickness of the first internal portion 6 of the mobile ring 2 and h2 its height, h the height of a part of the first internal portion 6 that protrudes externally flush with the element 10, R the radius of curvature of the surface of the third internal portion 8 and h3 the height of its center from the lower level of the mobile ring 2.

The operating principle of the triggering system is illustrated in FIGS. 5 and 6. When the kinematic triggering condition occurs, the lower surface of the mobile ring 2 is struck by an abutment surface 20. The mobile ring 2 is pushed until it engages the flanges 3 formed on the ring 1. The suitably profiled internal surface of the mobile ring 2 exerts a force on the flanges 3 of the ring 1, that acts with initial moment arm b0 in relation to the root of the flanges 3 and which entails, in addition to a determined applied load value, the development of a plastic hinge at their base, around which the flanges 3 rotate inwards. The internal surface of the flanges 3 exerts a pressure on the side walls of the tube 11, inducing the formation of a first buckle at the point 21. At the end of the stroke of the mobile ring 2, the abutment surface 20 impacts the base of the element of support 10 directly, axially loading the tube 11 pre-damaged by the action of the flanges 3, at this point the moment arm has become b1.

The mechanism of the invention triggers the plastic collapse of a thin-walled metal absorber when a kinematic condition occurs, causing the movement of a mobile ring by any mechanism. In contrast to other systems that can be used for reducing the load peaks in the failure of energy absorbers based on the deformation of structural elements, the mechanism of the present invention enables control in movement, and not in force, of the activation of the energy absorption process.

This characteristic enables production of absorbing systems adopting the thin-walled element as secondary stage of energy absorption, active in emergency conditions. When the stroke of the primary absorbing stage has been depleted, an abutment surface engages the mobile part of the mechanism that triggers the collapse of the thin-walled element. The latter, in operative conditions that do not require high energy absorption performances, can carry out structural functions inside the structure in which it is integrated. The system, even though based on a device that absorbs energy by mechanical deformation of an element, does not require the introduction of constraints designed for failing at a preset level of force, such as notched or weakened connecting organs.

The primary absorbing stage can even be reduced to an elastic support with stiffness properties suitably calibrated.

The choice of the height f at which the flange on the thin-wall casing acts can be based on such characteristic value of the collapse phenomenon.

For absorbers having a circular cross-section, the half-length λ of the buckle can be taken from the simplified mechanical models of the failure process. For formation of buckles according to an axial-symmetrical mode, the half-length λ of the buckles can be expressed as:

$$\lambda = \left(\frac{\pi Dt}{2\sqrt{3}}\right)^{\frac{1}{2}}$$

Assuming f≈λ, the pressure exerted by the flange is localized in the vicinity of the zone of formation of the plastic hinge corresponding to the formation of the first buckle caused by the collapse for local instability of the thin-walled element.

The height of the flange, f1, and the characteristic angle, α, will have to be such that, once the flange has completed the rotation around the plastic hinge developed at its base, they cause an indentation in the thin walls of the element to a depth at least greater than their thickness. Using angles of between 30° and 40° and assuming f1≈f/2, good results in terms of overall radial dimensions of the mechanism can be obtained.

The internal profile of the mobile ring is chosen so as to guarantee a coupling with the external surface of the flanges, characterized by a high moment of the normal force of contact between the two parts of the mechanism, during the entire rotation process of the flange. The stoke, h, of the mobile ring 2 must be sufficient to enable the profile of the ring to provoke a nearly complete rotation of the flange 3 before the impact force, transmitted by the abutment surface, is applied to the support and transmitted directly to the absorber 11.

The thickness of the fixed ring 1, s1, and of the mobile ring 2, s2, are chosen on the basis of structural and constructive considerations. For the operation of the mechanism, the force to apply to the mobile ring 2 to obtain the formation of the plastic hinge at the base of the flange 3 must be significantly less than the average collapse force of the absorber 11. This observation permits the introduction of an upper limit to the thickness s1, calculating the plastic collapse moment of the section at the root of the flange. The thickness s2, determined for the overall radial dimension of the mechanism, can be limited by choosing a material with high yield stress for the production of the mobile ring 2.

To facilitate the formation of the plastic hinges, the fixed ring 1 can be notched at the base of the flanges.

The operation of the mechanism has been verified with experimental tests performed using test equipment in which several of the installation conditions of the mechanism in an absorbing system have been reproduced. A system having dimensions as shown in the example 1 of table 1 was used in the tests, and as material an aluminium alloy Al 6060-T5 was used. The dimensions of a similar system with smaller dimensions are shown in the example 2 of table 1.

The system was mounted on a test apparatus consisting of a cylindrical steel base, at whose upper extremity the end of the metal tube 11 is placed opposite the triggering mechanism. In this manner, the effectiveness of the system was assessed carrying out an impact test with a drop test tower, wherein an impacting mass equal to 250 Kg was dropped from a height of 4.5 mt on the lower surface of the mobile ring.

Reference impact tests were also carried out on metal tubes identical to the previously described tube, without using the triggering mechanism. The tube was simply placed on the plate.

TABLE 1

| Reference | Example 1 | Example 2 |
| --- | --- | --- |
| D | 112.25 (mm) | 58.80 (mm) |
| T | 2.75 (mm) | 1.2 (mm) |
| D/t | 41 (mm) | 49 (mm) |
| L | 250 (mm) | 160 (mm) |
| D1 | 150 (mm) | 76 (mm) |
| F | 16 (mm) | 8 (mm) |
| F1 | 10 (mm) | — |
| S1 | 4.3 (mm) | 2.3 (mm) |
| S2 | 10 (mm) | — |
| H | 10 (mm) | 8 (mm) |
| H1 | 53 (mm) | — |
| H2 | 20 (mm) | — |
| H3 | 31 (mm) | — |
| R | 30 (mm) | — |
| A | 35° | — |
| Λ | 16.75 (mm) | 8.00 (mm) |
| $(P_m/M_o)_1$ | 80000 N | — |
| $(P_m/M_o)_2$ | 96000 N | — |
| $(P_m/M_o)_3$ | 119000 N | — |

The results of the tests can be seen from the graph in FIG. 7, in which the tube shortening S (mm) is the abscissa and the force F (KN) applied is the ordinate. A reference tube without a triggering mechanism is represented by the continuous line, and a system in accordance with the present invention is represented by the dotted line.

The result obtained shows a reduction of the maximum force from about 185000 N to 131000 N, with the substantial disappearance of the initial load peak.

Figure 8:
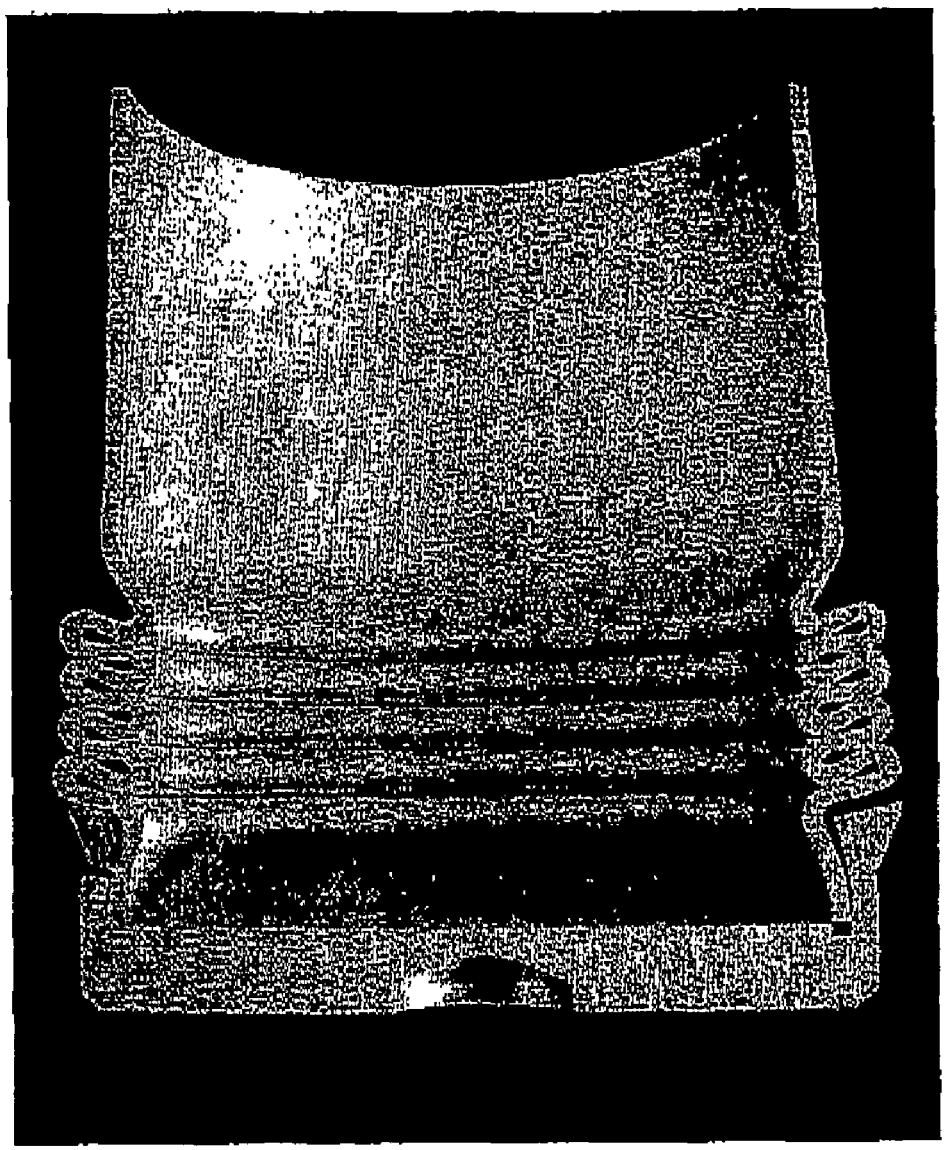
FIG. 8 is a photo of a cross-section of a system in accordance with the present invention after having collapsed.

The result obtained can also be seen in FIGS. 8 and 9, in which part of the fixed ring 1, the element 10, and the absorber 11 respectively are shown in section, by means of a photo and the result of a finite element numerical model. The symmetry and the significant plastic deformations can be noted in the buckled shape of the absorber 11.

The mechanism, illustrated for a cylindrical absorber, can be adapted to thin-walled elements with different geometries, such as for an absorber with a hexagonal cross-section as shown in FIG. 10, or with a square cross-section as shown in FIG. 11. FIG. 10 shows a tubular element 30 with hexagonal cross-section, a fixed ring 31, a mobile ring 32, and an element 33 for supporting and securing the triggering mechanism. FIG. 11 shows a tubular element 34 with square cross-section, a fixed ring 35, and a mobile ring 36.

For an absorber with square section, the collapse can occur according to a mode that is non-symmetrical, with two opposite sides that buckle inwards and the adjacent sides pushed outwards. In this case, the flanged element 35 is made on a plate 37 that performs the function of the element 10 illustrated in FIG. 2, and lies only on two sides of the element with square section 34. The mobile part 36, that functions identical to the mobile ring 2, can slide along guides provided on the plate 37.

Figure 12:
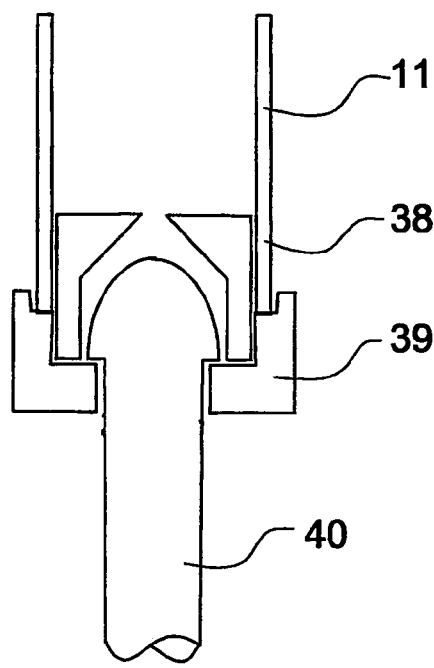
FIG. 12 is a cross-section of a triggering mechanism including a tubular absorbing element assembled in accordance, with a variant of the present invention.

In the examples given above, the fixed ring 1 and the mobile ring 2 are placed outside the tubular element 11, but, in accordance with the present invention, it is also possible to place these elements inside the tubular element 11, as can be seen in FIG. 12.

In the embodiment shown in FIG. 12, the tube 11 is placed on a support 39, on which the fixed ring 38 is also placed. In the place of the mobile ring 2, there is a mobile element 40. The ring 38 has its flanges turned inwards, and the mobile element 40 moves upwards to push with the flanges of the fixed ring 38 towards the tube 11 to provoke the first buckle.

Since the system for eliminating the load and the collapse activation peak is controlled kinematically and the absorber element can be used with structural functions, the parts of the mechanism can be modified to enable its integration in any structural layout. In particular, the mobile part of the system can be worked to permit the realization of hinge connections placed on the element 10. The system can therefore be integrated into a truss type structure. The mechanism with square section, illustrated in FIG. 11, can be integrated in the support structure of a protective barrier, mounted on elastic supports, such as in bumper bars in vehicles, where the mobile part, connected to the protective barrier that can slide on guides, comes into contact with the flanges secured to a support beam when the elastic supports that construct the constraint of the barrier have completed their stroke and, possibly, by a first absorption stage for low velocity crashes.

One of the fundamental aspects of the realization of structures of aircraft with crashworthy characteristics is the dissipation of the impact energy in impact conditions with vertical velocities higher than in the normal operative landing operations (crash). The absorption of the impact energy can be handled by to a series of subsystems integrated in the structure, whose performances limit the forces transmitted to the primary structures, with the purpose of reducing the accelerations experienced by the occupants of the aircraft. The landing gear represents one of the locations where these subsystems can be integrated with adequate constructive solutions.

A suitably designed landing system can potentially absorb a significant amount of the impact energy. Even though the contribution offered by the landing gear cannot be used in some cases, such as in impacts on water or on soft ground or in impacts with landing gear retracted, these landing systems can prevent or minimize the injuries of the occupants of the aircraft in many conditions, and are at present adopted by several military helicopters.

Following simple considerations of structural order and consistency with the specifications introduced in the military reference regulations in the aeronautic field, the landing gear must supply a significant contribution in the absorption of the impact energy at levels of force that do not entail the failure of the constraint structure of the landing system to the fuselage. The control of the levels of force during the functioning of the system is therefore fundamental. The maximum load values allowable are determined by the resistance of the primary structural elements that permit the transmission of the ground reactions through the landing gear in order to decelerate the whole aircraft mass during the impact.

The energy absorption performance required from the landing system in crash conditions can be obtained providing, in the absorbing system, a stage of energy absorption specifically designed and active only in emergency conditions. As an alternative to the adoption of a multi-stage oleo dynamic shock absorber, a system based on the plastic collapse of a structural element can be integrated into the landing gear layout.

The triggering system of the present invention adapts particularly to activate and control the collapse process of a thin-walled cylindrical element, mounted coaxially to the cylinder of the oleo dynamic shock absorber, producing a landing system at several stages with limited dimensions and considerable performances in terms of energy absorption and efficiency.

Figure 13:
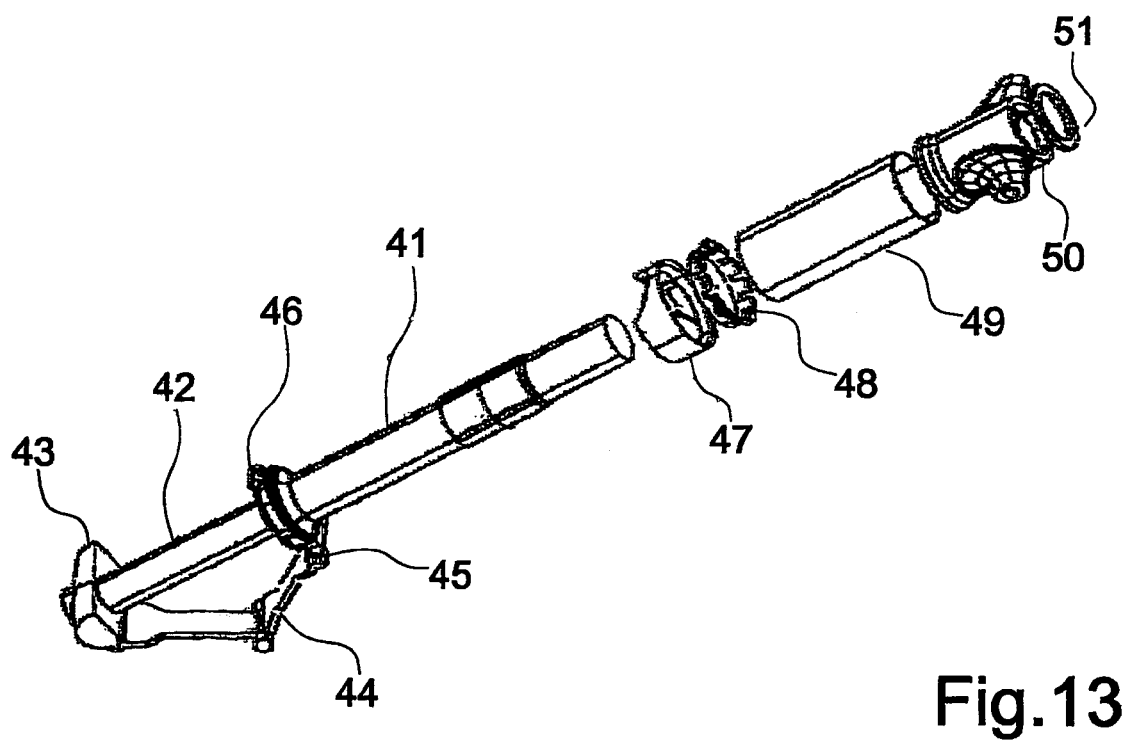
FIG. 13 is a perspective view of a landing system in accordance with the present invention.

The parts of the landing system are illustrated in FIG. 13.

The landing gear is constituted by the oleo dynamic shock absorber strut that comprises a cylinder 41 and a sliding piston 42 that is coupled with the wheel axle 43.

The torque arm 44 connects the wheel axle 43 to a lug 45 at the base of the cylinder 41. The attachment for the drag strut 46 is provided on the base of the cylinder 41, connected to the retraction system of the landing gear. The mobile ring 47 of the triggering mechanism is machined along the sides to house the attachments of the drag strut 46 and of the torque arm 44, and it is positioned at the base of the cylinder 41 sliding on two guides obtained at the sides of the base itself. The flanged fixed ring 48 of the triggering mechanism is screwed to the base of the cylinder. The metal tube 49 is inserted between an abutment made on the base of the cylinder and, above, on a housing made on the trunnion fitting 50 that represents the constraint structure to the fuselage of the landing gear. The ferrule 51 is screwed to the upper end of the cylinder 41, and prevents the cylinder from slipping downwards. When the end of the stroke is reached by the piston 42, the abutment coupled with the wheel axle 43 strikes the lower surface of the mobile ring 49, pushing it upward. The internal surface of the mobile ring is shaped so as to induce the flanges of the ring 48 to bend, forming plastic hinges at the root. The flanges create a pressure inwards on the metal tube 49 whose walls buckle.

The triggering mechanism aids the formation of the first buckle in the failure process of the metal tube 49. The metal tube 49 fails and the cylinder can slide through the trunnion fitting 50.

Suitably choosing the geometric characteristics and the material with which the metal tube is made, the average load transmitted to the fuselage during the progressive failure of the expendable element can be controlled.

To exploit the advantages offered by the mechanism, the oleo dynamic shock absorber must be adequately designed. In particular, even at high vertical velocity values, the force transmitted by the shock strut until it reaches the end of the stroke of the piston must be limited. Numerical evaluations indicate that this performance can be obtained by introducing, in the design of the oleo dynamic shock absorber, a system for limiting load originating from the pressure losses due to the passage of oil through the orifices on the piston. Constructively, this requirement can be met with control valves or fused orifices for limiting the load, functioning mechanically and calibrated on the level of force required.

The invention claimed is:

1. A system for triggering the plastic collapse of a metal structural element, said system comprising:
    an elongated tubular element;
    a fixed ring having a plurality of wedge-shaped flanges disposed along a side wall of said elongated tubular element; and
    a mobile element moveable relative to said fixed ring such that movement of said mobile element toward said wedge-shaped flanges causes said mobile element to interact with said wedge-shaped flanges, and said wedge-shaped flanges to exert pressure on the side wall of said elongated tubular element thereby buckling said elongated tubular element,
    wherein said wedge-shaped flanges are adapted to rotate toward an outer peripheral surface or an inner peripheral surface of said elongated tubular element.

2. The system in accordance with claim 1, wherein said fixed ring surrounds said elongated tubular element, and said mobile element is a ring that surrounds said fixed ring.

3. The system in accordance with claim 2, wherein said fixed ring comprises: a first tubular portion having an inner diameter and an outer diameter; and a second tubular portion defined by said plurality of wedge-shaped flanges, said second tubular portion having an inner diameter that is equal to the inner diameter of said first tubular portion and an outer diameter that is greater than the outer diameter of said first tubular portion.

4. The system in accordance with claim 1, wherein said fixed ring is within said elongated tubular element, and said mobile element is within said fixed ring.

5. The system in accordance with claim 1, wherein said fixed ring comprises: a first tubular portion having an inner diameter and an outer diameter; and a second tubular portion defined by said plurality of wedge-shaped flanges, said second tubular portion having an inner diameter that is equal to the inner diameter of said first tubular portion and an outer diameter that is greater than the outer diameter of said first tubular portion.

6. The system in accordance with claim 1, wherein said mobile element comprises a tapered surface for interacting with said wedge-shaped flanges.

7. The system in accordance with claim 1, wherein said mobile element comprises a peripheral tapered section having an arcuate profile, said tapered section having a tapered surface for interacting with said wedge-shaped flanges.

8. The system in accordance with claim 1, wherein said elongated tubular element has a circular cross-section.

9. The system in accordance with claim 1, wherein said elongated tubular element has a square cross-section.

10. The system in accordance with claim 1, wherein said elongated tubular element has a hexagonal cross-section.

11. The system in accordance with claim 1, further comprising a support element for supporting said mobile element, said fixed ring, and said elongated tubular element.

12. The system in accordance with claim 1, wherein said fixed ring is adjacent to an end of said elongated tubular element.

13. The system in accordance with claim 1, further comprising an abutment member having an abutment surface for engaging and moving said mobile element.

14. A landing gear for an aircraft, said landing gear comprising a shock strut adapted to be coupled to a wheel axle of the aircraft; and a system for triggering the plastic collapse of a metal structural element, said system being coupled in series with said shock strut and including:

an elongated tubular element;

a fixed ring having a plurality of wedge-shaped flanges disposed along a side wall of said elongated tubular element; and a mobile element moveable relative to said fixed ring such that movement of said mobile element toward said wedge-shaped flanges causes said mobile element to interact with said wedge-shaped flanges, and said wedge-shaped flanges to exert pressure on the side wall of said elongated tubular element thereby buckling said elongated tubular element, wherein said wedge-shaped flanges are adapted to rotate toward an outer peripheral surface or an inner peripheral surface of said elongated tubular element.

* * * * *